United States Patent [19]
Kayahara et al.

[11] Patent Number: 5,655,710
[45] Date of Patent: Aug. 12, 1997

[54] METHOD FOR CONTROLLING OPERATED-UNITS COUNT OF FLUID HEATING UNITS

[75] Inventors: Toshihiro Kayahara; Hirotsugu Hino, both of Matsuyama, Japan

[73] Assignee: Miura Co., Ltd., Ehime-Ken, Japan

[21] Appl. No.: 522,706

[22] Filed: Sep. 1, 1995

[30] Foreign Application Priority Data

Sep. 2, 1994 [JP] Japan ................................. 6-234217

[51] Int. Cl.⁶ ............................................. F22D 5/00
[52] U.S. Cl. ............................................. 237/81; 122/448.3
[58] Field of Search ........................ 122/448.3; 237/81

[56] References Cited

U.S. PATENT DOCUMENTS

| | | | |
|---|---|---|---|
| 3,576,177 | 4/1971 | Block et al. | 122/1 |
| 4,534,321 | 8/1985 | Rydborn | 122/448.3 |
| 4,860,696 | 8/1989 | Fujita | 122/448.3 |
| 4,864,972 | 9/1989 | Batey et al. | 122/448.3 |
| 5,042,431 | 8/1991 | Shprecher et al. | 122/448.3 |
| 5,172,654 | 12/1992 | Christiansen | 122/448.3 |
| 5,452,687 | 9/1995 | Christiansen | 122/448.3 |

*Primary Examiner*—William E. Tapolcai

[57] ABSTRACT

In a multi-unit installation system of fluid heating units such as hot water boilers, an outstandingly superior responsivity to load variations is obtained, and fluid of stable temperature is supplied by preventing useless starts and stops. In a units count control method, a plurality of fluid heating units (1) are arranged in parallel, these fluid heating units (1) and a load (2) are connected to each other through a fluid supply passage (3) and a fluid return passage (4), and the operated-units count out of the fluid heating units (1) is controlled in response to the load condition, wherein if a fluid supply temperature To in the fluid supply passage (3) is within a preset range, then a current operated-units count is maintained; if the supply temperature To is below the preset range, then the operated-units count is increased; and if the supply temperature To is above the preset range, then the operated-units count is decreased.

13 Claims, 2 Drawing Sheets

METHOD FOR CONTROLLING OPERATED-UNITS COUNT OF FLUID HEATING UNITS

BACKGROUND OF THE INVENTION

1. Field of the Invention

The present invention relates to a units count control method for automatically controlling the number of units to be operated out of fluid heating units installed in a plurality, such as hot water boilers, thermal liquid boilers, heat exchangers, and absorption type refrigerators, in response to the load condition.

2. Description of the Prior Art

As is well known, there have been put into practical use multi-unit installation systems of hot water boilers in which a plurality of hot water boilers are installed in parallel and the number of units to be operated out of these hot water boilers is automatically controlled in response to the load condition. Such a multi-unit installation system of hot water boilers is capable of making each hot water boiler operated at higher efficiency, as compared with the case in which a single unit of large-capacity hot water boiler is installed. Thus, the multi-unit installation system has advantages of producing notable effects on energy saving and being superior in responsivity to variations in the load.

However, in recent years, the multi-unit installation system of hot water boilers has been receiving growing demand for higher levels of responsivity to load variations as well as for prevention of useless starts and stops (i.e., supplying hot water of stable temperature).

SUMMARY OF THE INVENTION

The present invention has been developed in view of the aforementioned problems, and has an object for a multi-unit installation system of fluid heating units, such as hot water boilers, to obtain superior responsivity to variations in a load and to supply fluid of stable temperature by preventing useless starts and stops. Accordingly, the present invention provides a units count control method including steps of: arranging a plurality of fluid heating units in parallel, connecting these fluid heating units to a load through a fluid supply passage and a fluid return passage, controlling operated-units count out of the fluid heating units in response to load conditions, maintaining a current operated-units count when a fluid supply temperature To in the fluid supply passage is within a preset range, increasing the operated-units count when the supply temperature To is below the preset range, or decreasing the operated-units count when the supply temperature To is above the preset range.

The present invention also provides a units count control method including steps of: arranging a plurality of fluid heating units in parallel, connected these fluid heating units to a load through a fluid supply passage and a fluid return passage, controlling operated-units count out of the fluid heating units in response to load conditions, calculating an operation-permitted units count N out of the fluid heating units according to a specified equation, and delivering an operation-permitting signal to the operation-permitted units count N of fluid heating units.

The present invention still further provides a units count control method including steps of: arranging a plurality of fluid heating units in parallel, connecting these fluid heating units to a load through a fluid supply passage and a fluid return passage, controlling operated-units count out of the fluid heating units in response to load conditions, when a fluid supply temperature To in the fluid supply passage is below a preset range, comparing a current operated-units count Mo with a first operation-permitted units count Ma and a second operation-permitted units count Mb determined from a specified equation, where if Mo>Ma, then decrementing the operated-units count by one; if Mb<Mo≦Ma, then maintaining the current operated-units count; and if Mo≦Mb, then incrementing the operated-units count by one; when the supply temperature To is within the preset range, comparing the current operated-units count Mo with the first operation-permitted units count Ma and the second operation-permitted units count Mb determined from the specified equation, where if Mo>Ma, then decrementing the operated-units count by one; if Mb≦Mo≦Ma, then maintaining the current operated-units count; and if Mo<Mb, then incrementing the operated-units count by one; and when the supply temperature To is above the preset range, decrementing the operated-units count by one.

With the above constitution, the present invention makes it possible for a multi-unit installation system of fluid heating units, such as hot water boilers, to obtain an outstandingly superior responsivity to load variations and to supply fluid of stable temperature by preventing useless starts and stops.

DETAILED DESCRIPTION OF THE PREFERRED EMBODIMENTS

Figure 1:
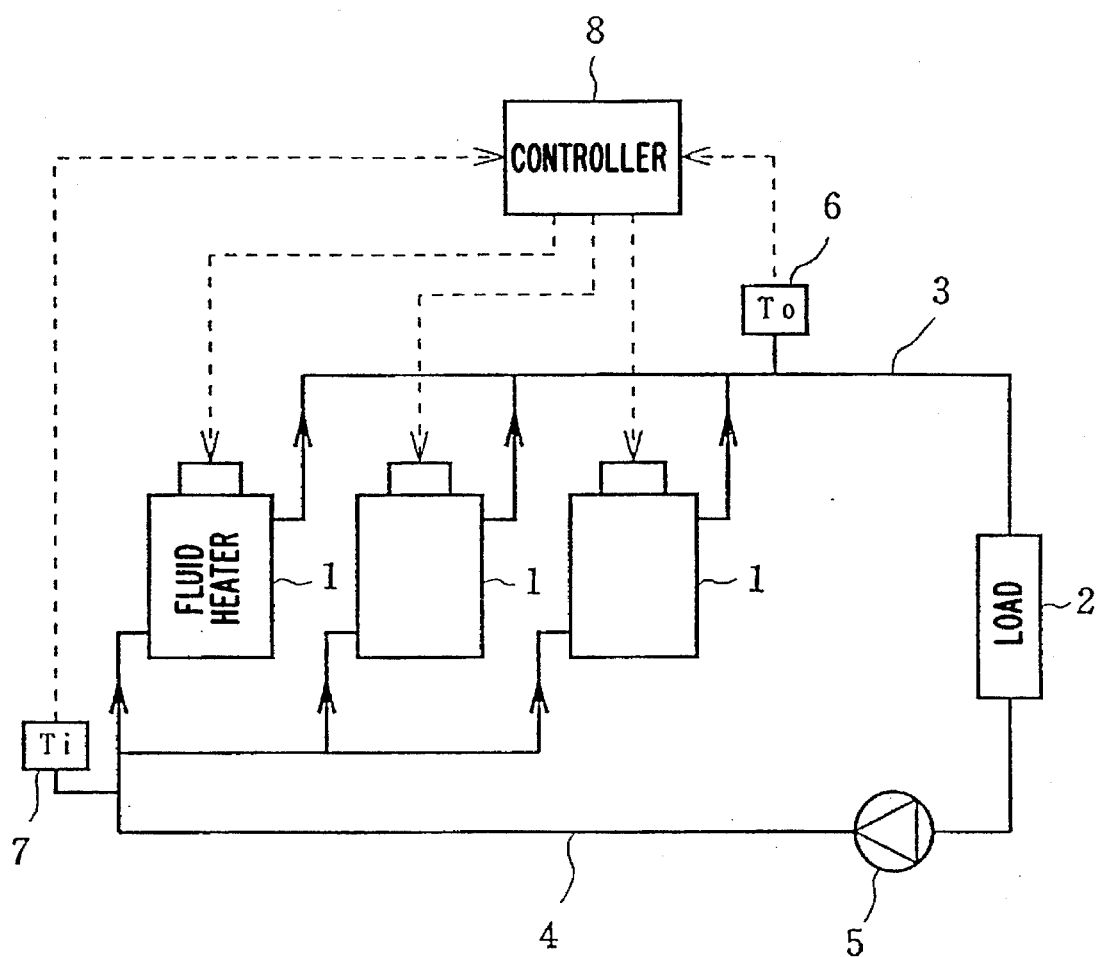
FIG. 1 is an explanatory view showing an embodiment of the present invention.

Hereinbelow, preferred embodiments of the present invention are described. Referring to FIG. 1, a plurality of fluid heating units 1 are installed in parallel, and these fluid heating units 1 are connected with a load 2 through a fluid supply passage 3 and a fluid return passage 4, where the number operated-units out of the fluid heating units 1 is controlled depending on the condition of the load. As the fluid heating units 1, applicable are hot water boilers, thermal liquid boilers, heat exchangers, absorption type refrigerators, and the like. A circulation pump 5 is inserted in the fluid return passage 4. The circulation pump 5 may otherwise be inserted in the fluid supply passage 3. The fluid supply passage 3 is provided with a first temperature sensor 6 for sensing a fluid supply temperature To. Also, the fluid return passage 4 is provided with a second temperature sensor 7 for sensing a fluid return temperature Ti. Based on signals derived from these temperature sensors, the number of operated-units out of the fluid heating units 1 is controlled by a controller 8 according to a preset control procedure.

With the above constitution, a first embodiment of the specific units count control method is explained. First, an operation-permitted units count N out of the fluid heating units 1 is calculated according to the following equation, and an operation-permitting signal is delivered to the n operation-permitted units from among the fluid heating units 1:

$$N = M \times (To_{set} - Ti)/(T_B - Ti) \qquad \text{(Eq. A)}$$

where M is the total number of the fluid heating units 1;

$TO_{set}$ is the fluid set temperature in the fluid supply passage 3;

Ti is the fluid return temperature in the fluid return passage 4; and $T_B$ is the set temperature of the fluid heating units 1.

The operation-permitted units count N is given by an integer value with decimals omitted. Actual ON-OFF operation of the fluid heating units 1 that have received the operation-permitting signal is dependent on set values which have been set to the individual fluid heating units 1. For example, in the case of hot water boilers, even upon reception of an operation-permitting signal, a hot water boiler will stay in a burning-OFF state if the temperature of hot water in the boiler unit is not less than a set value, where the ON-OFF control of burning is dependent on set values set to the individual hot water boilers. As a result, the possibility of overshooting the set value of fluid supply temperature To can be reduced effectively at initial start-up.

Next, based on the fluid supply temperature To in the fluid supply passage 3, such control operation is performed that the current operated-units count is maintained when the supply temperature To is within a preset range, that the operated-units count is increased when the supply temperature To is below the preset range, and that the operated-units count is decreased when the supply temperature To is above the preset range. The decision of maintaining increasing or decreasing the operated-units count is made every specified time interval (for example, every 10 seconds), and the operated-units count is increased or decreased by one unit at a time. The aforementioned preset range is a range whose upper limit value is given by a fluid set temperature $To_{set}$ in the fluid supply passage 3 and whose lower limit value is given by subtracting $\Delta Tw$ (e.g., about 5° C.) from the set temperature $TO_{set}$. When the value of the supply temperature To falls within $\Delta Tw$, the current operated-units count is maintained so that the fluid heating units 1 can be prevented from useless starts and stops, whereby the supply temperature To can be held stable.

As the aforementioned fluid supply temperature To in the fluid supply passage 3, a value measured by the first temperature sensor 6 may be used. Otherwise, based on the operation-permitted units count N, an average value To' of exit temperatures of the fluid at the exits of the fluid heating units 1 is determined from the following equation, and the resulting value may also be used as the fluid supply temperature To:

$$To'=\{N \times T_B+(M-N) \times Ti\}/M$$

Also, when the operated-units count out of the fluid heating units 1 is controlled based on the fluid supply temperature To in the fluid supply passage 3, the control may also be accomplished according to the following conditions. That is, when the fluid supply temperature To in the fluid supply passage 3 is within a preset range, the current operated-units count is maintained; when the supply temperature To is below the preset range and when the fluid return temperature Ti in the fluid return passage 4 has fallen, the operated-units count is increased; and when the supply temperature To is above the preset range and when the fluid return temperature Ti in the fluid return passage 4 has risen, the operated-units count is decreased.

Figure 2:
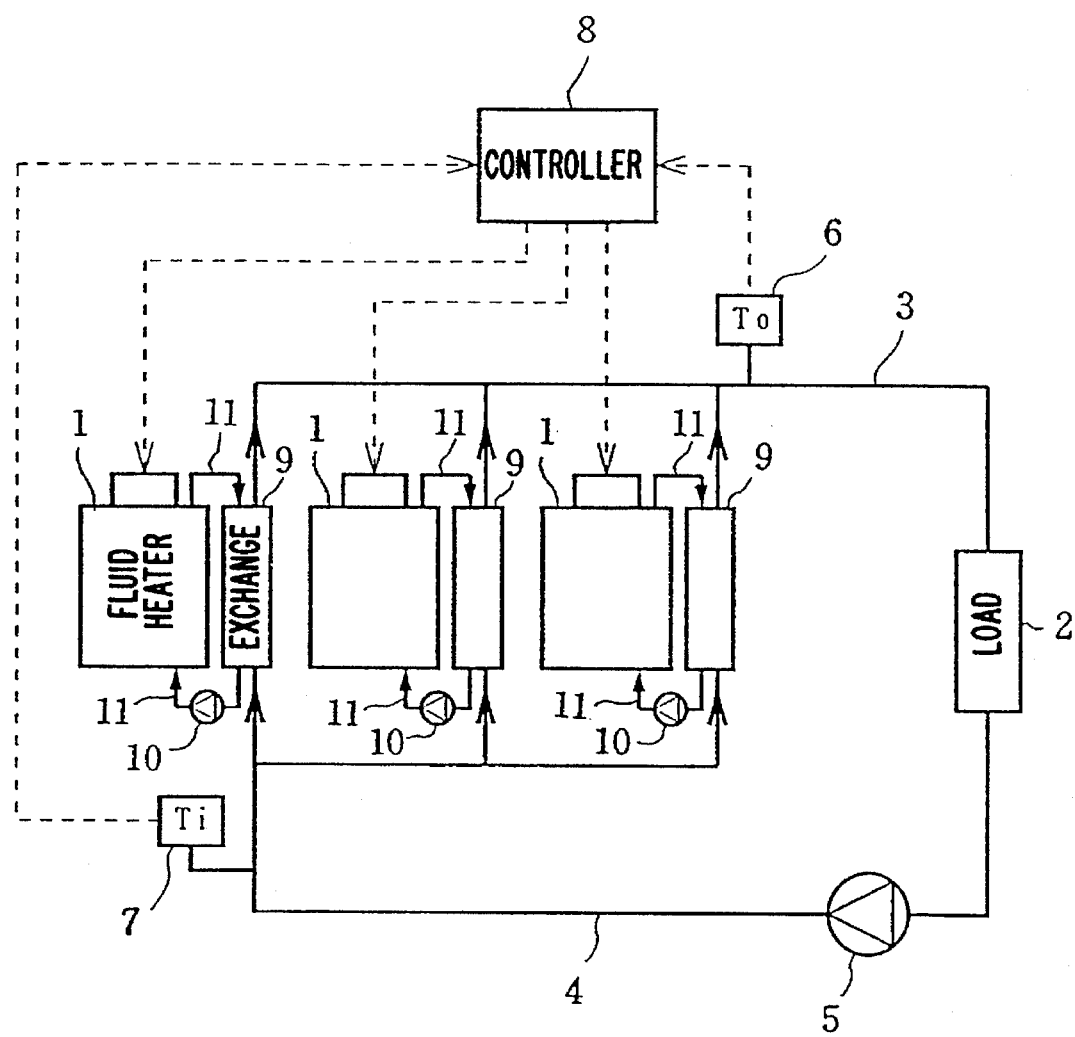
FIG. 2 is an explanatory view showing another embodiment of the present invention.

An embodiment depicted in FIG. 2 shows a constitution that a heat exchanger 9 is additionally equipped to each fluid heating unit 1, and the fluid heating unit 1 and the heat exchanger 9 are connected to each other with a circulation line 11 in which a circulation pump 10 is inserted, and further a fluid supply passage 3 and a fluid return passage 4 are connected to the heat exchangers 9. The fluid heated within the fluid heating units 1 circulates to and from the heat exchangers 9, and is thereby heat-exchanged with the fluid that flows through the fluid supply passage 3 and the fluid return passage 4 by the heat exchangers 9. Components designated by the same numerals as in FIG. 1 have like functions in principle and are therefore omitted for detailed description.

It is possible to apply the above-described first embodiment of units-count control method to the embodiment as shown in FIG. 2. However, the following second embodiment of units-count control method is applicable as well. Hereinbelow, the second embodiment of units-count control method is explained. First, a temperature increasability $\Delta T_B$ for each boiler is determined based on the circulation flow rate of fluid that circulates through the fluid supply passage 3 and the fluid return passage 4, and the operation-permitted units count N out of the fluid heating units 1 is calculated according to the following equation, and further an operation-permitting signal is delivered to the operation-permitted units count N of fluid heating units 1:

$$N=M \times (To_{set}-Ti)/\Delta T_B \qquad \text{(Eq. B)}$$

where M is the total number of the fluid heating units 1;

$TO_{set}$ is the fluid set temperature in the fluid supply passage 3; and

Ti is the fluid return temperature in the fluid return passage 4.

The operation/permitted units count N is given by an integer value with decimals omitted. For the process of determining the temperature increasability $\Delta T_B$ for each boiler based on the circulation flow rate of fluid that circulates through the fluid supply passage 3 and the fluid return passage 4, the relationship between the circulation flow rate and the temperature increasability $\Delta T_B$ is determined by experiments, and the temperature increasability $\Delta T_B$ is determined based on the experimental results. The circulation flow rate can be either detected directly by providing a flowmeter or calculated from a thermal balance by taking into account the fluid return temperature Ti in the fluid return passage 4, the fluid temperature within the fluid heating units 1, the fluid temperature at the exits of the heat exchangers 9, the circulation flow rate between the fluid heating units 1 and the heat exchangers 9, and the like. The aforementioned arrangement includes determining the temperature increasability $\Delta T_B$ from the circulation flow rate of fluid that circulates through the fluid supply passage 3 and the fluid return passage 4, and is thus superior in responsivity to load variations.

Next, if the fluid supply temperature To in the fluid supply passage 3 is below a preset range, then the operated-units count N is incremented by one; if the supply temperature To is above the preset range, then the operated-units count N is decremented by one; and if the supply temperature To is within the preset range, then the operation-permitted units count N is compared with Na=abs(N) and Nb=Na+1 after a time elapse of a set delay time $T_{DELAY}$, where if Na≤N≤Nb, then the current operated-units count is maintained; if N<Na, then the operated-units count is incremented by one; and if N>Nb, then the operated-units count is decremented by one. The decision of incrementing or decrementing the operated-units count is made every specified time interval (e.g., every 10 seconds). The aforementioned preset range is a range whose upper limit value is the fluid set temperature To in the fluid supply passage 3, and whose lower limit value is a value resulting from subtracting $\Delta Tw$ (about 5° C.) from the set temperature $TO_{SET}$. With this constitution, since the operated-units count is free from any abrupt change, the supply temperature To is unlikely to go into any fluctuating state, and even if a fluctuating state occurs, it will easily converge.

As the fluid supply temperature To in the fluid supply passage 3, a value measured by the first temperature sensor 6 may be used. Otherwise, based on the operation-permitted units count N, an average value To' of fluid exit temperatures at the exits of the individual fluid heating units 1 is determined from the following equation, and the resulting value may also be used as the fluid supply temperature To:

$$To' = \{N \times T_B + (M-N) \times Ti\}/M$$

Next, a third embodiment of the units count control method is explained with respect to an example in which the method is applied to the system as shown in FIG. 1. First, a comparison is made between the fluid return temperature Ti in the fluid return passage 4 and the lower limit value $To_{SET} - \Delta Tw$ of the fluid set temperature range in the fluid supply passage 3. Then, if $Ti > To_{SET} - \Delta Tw$, then the current operated-units count is decremented by one. If $Ti \leq To_{SET} - \Delta Tw$, then a fluid heatability $T_B'$ of the fluid heating units 1 is determined in the following way. First, the operation-permitted units count N is determined by the aforementioned Equation A or Equation B, where if N=0, then X=max $T_B$, and if $N \leq 1$, then $X = Ti + \{(To_{SET} - \Delta Tw) - Ti\} \times M/N$, on which assumptions the value of temperature X that can then be supplied by the fluid heating units 1 is determined. In this process, the supply temperature is limited by the stop temperature at which the fluid heating units 1 are stopped. So, if X>max $T_B$, then $T_B'$=max $T_B$, and if $X \leq$ max $T_B$, then $T_B' = T_B -$ (differential of fluid heating units)/2

Subsequently, based on the aforementioned fluid heatability $T_B'$ of the fluid heating units 1, a first operation-permitted units count Ma and a second operation-permitted units count Mb are determined from the following equations:

$$Ma = M \times (To_{SET} - Ti)/(T_B' - Ti)$$

$$Mb = M \times (To_{SET} - \Delta Tw - Ti)/(T_B' - Ti)$$

where M is the total number of the fluid heating units 1;

$To_{set}$ is the upper limit value of the fluid set temperature range in the fluid supply passage 3;

$To_{set} - \Delta Tw$ is the lower limit value of the fluid set temperature range in the fluid supply passage 3;

Ti is the fluid return temperature in the fluid return passage 4; and $T_B'$ is the fluid heatability of the fluid heating units 1.

The first operation-permitted units count Ma and the second operation-permitted units count Mb are given by values obtained by omitting decimals. Then, when the fluid supply temperature To in the fluid supply passage 3 is below a preset range, the current operated-units count Mo is compared with the first operation-permitted units count Ma and the second operation-permitted units count Mb determined from the above equations, where if Mo>Ma, then the operated-units count is decremented by one; if Mb<Mo≦Ma, then the current operated-units count is maintained; and if Mo≦Mb, then the operated-units count is incremented by one. Also, when the supply temperature To is within the preset range, the current operated-units count Mo is compared with the first operation-permitted units count Ma and the second operation-permitted units count Mb determined from the above equations, where if Mo>Ma, then the operated-units count is decremented by one; if Mb≦Mo≦Ma, then the current operated-units count is maintained; and if Mo<Mb, then the operated-units count is incremented by one. Further, when the supply temperature To is above the preset range, the operated-units count is decremented by one.

The above calculation of the first operation-permitted units count Ma and the second operation-permitted units count Mb should be performed after a set delay time $T_{DELAY}$ has elapsed since the sensing of temperatures, in view of a time delay required for the fluid supplied from the fluid heating units 1 to be mixed generally uniformly. With the above-described arrangement, variations in the supply temperature due to variations in the circulation flow rate can be detected promptly so that the responsivity to load variations can be improved markedly.

The present invention, having the constitution as described above, makes it possible for a multi-unit system of fluid heating units, such as hot water boilers, to obtain an outstandingly superior responsivity to load variations and to supply fluid of stable temperature by preventing useless starts and stops.

What is claimed is:

1. A units count control method comprising the steps of:
arranging a plurality of fluid temperature changing units in parallel;
connecting the fluid temperature changing units to a load through a fluid supply passage and a fluid return passage; and
controlling an operated-units count out of the fluid temperature changing units in response to load conditions by maintaining a current operated-units count when a fluid supply temperature To in the fluid supply passage is within a preset range; increasing the operated-units count when the supply temperature To is below the preset range; decreasing the operated-units count when the supply temperature To is above the preset range; and deciding whether to maintain, increase or decrease the operated-units count at predetermined time intervals.

2. The units count control method as claimed in claim 1, the method further comprising the step of using an average value To' of fluid exit temperatures at exits of the individual fluid temperature changing units as To.

3. The units count control method as claimed in claim 1, wherein said controlling step increases or decreases the operated-units count by one unit at a time.

4. A units control method comprising the steps of:
arranging a plurality of temperature changing units in parallel;
connecting the temperature changing units to a load through a supply passage and a return passage; and
controlling an operated-units count out of the temperature changing units in response to load conditions, the method further comprising steps of: calculating a operation-permitted units count N out of the temperature changing units according to the following equation; and delivering an operation-permitting signal to the operation-permitted units count N of temperature changing:

$$N = M \times (To_{set} - Ti)/(T_B - Ti)$$

where M is a total number of the temperature changing units;

$To_{set}$ is a set temperature in the supply passage;

Ti is a return temperature in the return passage; and $T_B$ is a set temperature of the temperature changing units.

5. The units count control method is claimed in claim 4, the method further comprising the steps of: when the supply temperature To in the supply passage is below a preset range, incrementing the operated-units count N by one; when the supply temperature To is above the preset range, decrementing the operated-units count N by one; and when the supply temperature To is within the preset range, comparing the operation-permitted units count N with Na=abs(N) and Nb=Na+1, where if Na≦N≦Nb, then maintaining the current operated-units count; if N<Na, then incrementing the operated units count by one; and if N>Nb, then decrementing the operated-units count by one.

6. The units count control method as claimed in claim 5, wherein the fluid temperature changing units are fluid heating units.

7. The units count control method as claimed in claim 4, wherein the temperature changing units are fluid heating units, the supply passage is a fluid supply passage, and the return passage is a fluid return passage.

8. The units count control method as claimed in claim 7, the method further comprising using an average value To' of fluid exit temperatures at exits of the individual fluid heating units as To.

9. A units count control method comprising the steps of:
arranging a plurality of fluid temperature changing units in parallel;

connecting the fluid temperature changing units to a load through a fluid supply passage and a fluid return passage; and controlling an operated-units count out of the fluid temperature changing units in response to load conditions, the method further comprising steps of: determining a temperature increasability $\Delta T_B$ for each fluid temperature changing unit based on a circulation flow rate of fluid that circulates through the fluid supply passage and the fluid return passage; calculating an operation-permitted units count N out of the fluid temperature changing units according to the following equation; and delivering an operation-permitting signal to the operation-permitted units count N of fluid temperature changing units:

$$N=M\times(To_{SET}-Ti)/\Delta T_B$$

where M is a total number of the fluid temperature changing units;

$To_{SET}$ is a fluid set temperature in the fluid supply passage; and

Ti is a fluid return temperature in the fluid return passage.

10. The units count control method as claimed in claim 9, the method further comprising the steps of: when the fluid supply temperature To in the fluid supply passage is below a preset range, incrementing the operating-units count N by one; when the supply temperature To is above the preset range, decrementing the operated-units count N by one; and when the supply temperature To is within the preset range, comparing the operation-permitted units count N with Na=abs(N) and Nb=Na+1, where if Na≦N≦Nb, then maintaining the current operated-units count; if N<Na, then incrementing the operated-units count by one; and if N>Nb, then decrementing the operated-units count by one.

11. The units count control method as claimed in claim 10, the method further comprising using an average value To' of fluid exit temperature at exits of the individual fluid heating units as To.

12. A units count control method comprising the steps of:
arranging a plurality of fluid heating units in parallel, connecting the fluid heating units to a load through a fluid supply passage and a fluid return passage, and controlling operated-units count out of the fluid heating units in response to load conditions, the method further comprising: when a fluid supply temperature To in the fluid supply passage is below a preset range, comparing a current operated-units count Mo with a first operation-permitted units count Ma and a second operation-permitted units count Mb determined from the following equations, where if Mo>Ma, then decrementing the operated-units count by one; if Mb<Mo≦Ma, then maintaining the current operated-units count; and if Mo≦Mb, then incrementing the operated-units count by one, when the supply temperature To is within the preset range, comparing the current operated-units count Mo with the first operation-permitted units count Ma and the second operation-permitted units count Mb determined from the following equations, where if Mo>Ma, then decrementing the operated-units count by one; if Mb≦Mo≦Ma, then maintaining the current operated-units count; and if Mo<Mb, the incrementing the operated-units count by one; and when the supply temperature To is above the preset range, decrementing the operated units count by one:

$$Ma=M\times(To_{SET}-Ti)/(T_B'-Ti)$$

$$Mb=M\times(To_{SET}-\Delta Tw-Ti)/T_B'-Ti)$$

where M is a total number of the fluid heating units;

$To_{set}$ is an upper limit value of a fluid set temperature range in the fluid supply passage;

$To_{set}-\Delta Tw$ is a lower limit value of the fluid set temperature range in the fluid supply passage;

Ti is a fluid return temperature in the fluid return passage; and $T_B'$ is a fluid heatability of the fluid heating units.

13. The units count control method as claimed in claim 12, the method further comprising using an average value To' of fluid exit temperatures at exits of the individual fluid heating units as To.

* * * * *